Sept. 7, 1943.  J. R. DORMAN  2,328,895
CLUTCH THROW-OUT BEARING
Filed Nov. 1, 1940
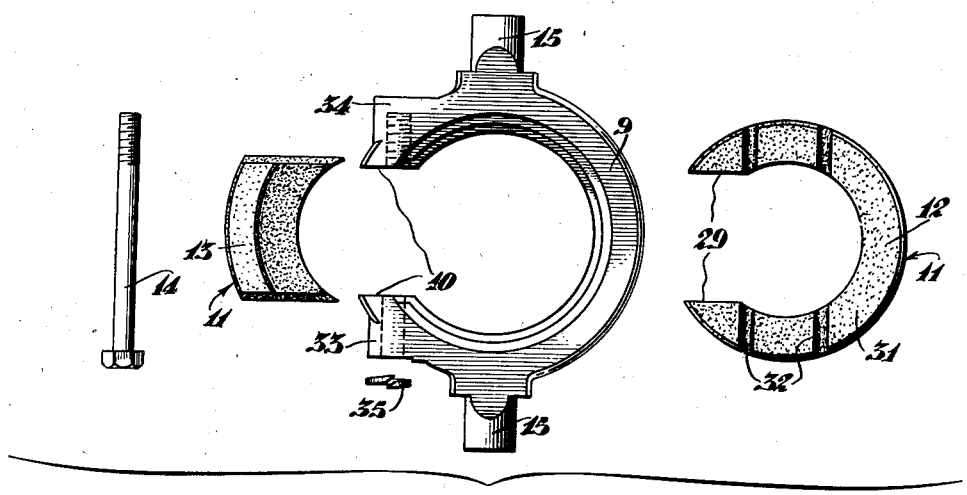
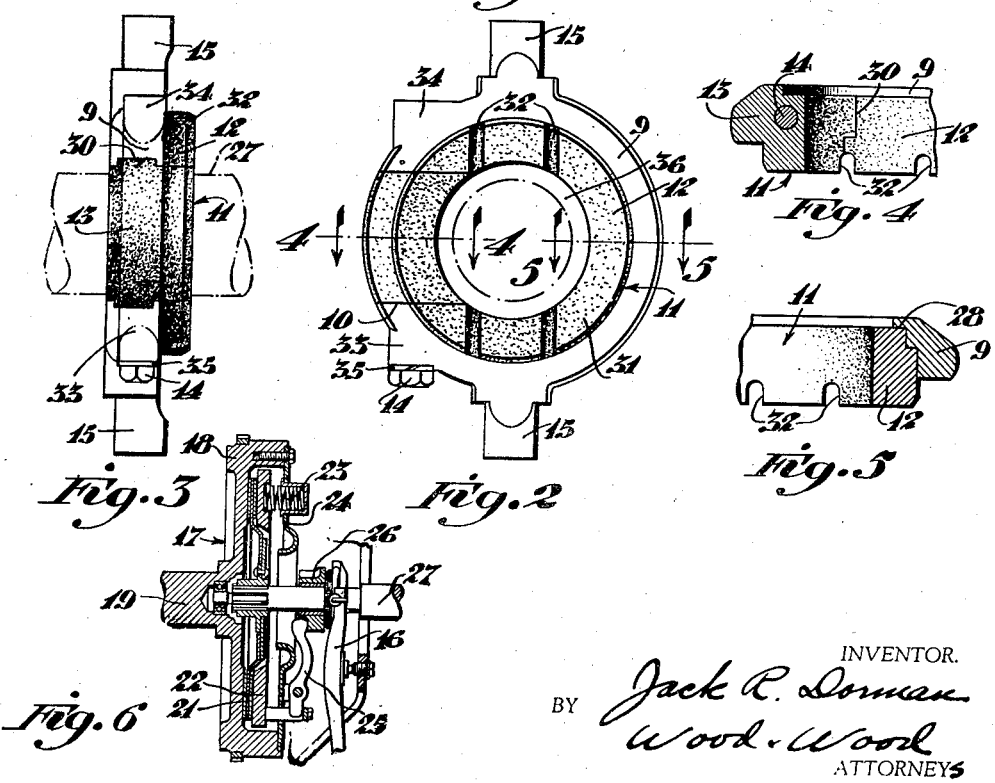
INVENTOR.
Jack R. Dorman
BY Wood & Wood
ATTORNEYS Patented Sept. 7, 1943

2,328,895

UNITED STATES PATENT OFFICE 2,328,895

CLUTCH THROWOUT BEARING

Jack R. Dorman, Cincinnati, Ohio

Application November 1, 1940, Serial No. 363,921

8 Claims. (Cl. 192—110)

This invention relates to clutches of the type used for controlling the coupling of power, for example, from an engine to a propeller or drive shaft. More particularly, the invention is directed to the clutch throw-out bearing.

Clutch throw-out bearings wear out quite rapidly. In fact, more trouble develops at this point in the average automobile construction than at any other point. The bearing or contact elements of the unit are made of carbon and accordingly, will wear out in time or will break. When the clutch throw-out bearing does become worn, or the bearing element itself is broken, the problem of replacement is extremely difficult. The clutch throw-out bearing completely encircles the drive shaft. Therefore it is obvious that the shaft must be dismounted and the throw-out bearing removed from one end of the shaft. This usually requires disassembly or partial disassembly of the clutch.

It has been the object of the present inventor to provide a clutch throw-out bearing which can be assembled and disassembled relative to the clutch and drive shaft without disassembling the clutch or pulling the shaft.

It has been a further object of the present inventor to provide a clutch throw-out bearing which includes a removable section or insert providing clearance so that the throw-out bearing may be engaged upon or disengaged from the shaft laterally and may be secured in place by means of a clamping bolt, holding the removable section firmly in the clearance opening of the bearing.

Another fault of the throw-out bearing in current use is that the bearing elements themselves; that is, the contact elements, loosen within the supporting body of the bearing and rotate, which actions hasten their destruction not only because of heat resulting from friction, but because of vibration resulting from looseness.

Accordingly, it has been a further object of the present inventor to provide a bearing sleeve assembly which cannot rotate or move axially within the bearing body. In solving this particular problem, the inventor has found it expedient to mount the insert section so that it not only functions to provide the clearance for assembly but also functions as a key for holding the main bearing section against rotation and axial movement within the body.

Other objects of the inventor and certain advantages of the invention will be more fully apparent from the description of the drawing in which:

Figure 1 is an exploded view of the improved clutch throw-out bearing showing the various parts in elevation.

Figure 2 is a front view of the assembled bearing.

Figure 3 is a side view of the bearing.

Figure 4 is a sectional view taken on line 4—4 in Figure 2.

Figure 5 is a sectional view taken on line 5—5 in Figure 2.

Figure 6 is a diagrammatic sectional view of a typical clutch illustrating the environment of throw-out bearings of the type embodied in the present invention.

The elements constituting the clutch throw-out bearing assembly of the present invention are best shown in Figure 1 of the drawing. The assembly comprises a throw-out collar, 9, cut away or slotted at one side as at 10; a clutch throw-out bearing 11 made in two bearing ring sections 12 and 13, the second of which constitutes an insertable key element; and a lock bolt 14. The bearing elements preferably are made of a bronze graphite compound, thus, requiring no lubrication; but it will be understood that other materials could be utilized without departing from the spirit of the invention.

The collar 9 is provided with the conventional studs or trunnions 15—15, extending radially from the top and bottom thereof, for engagement and operation by the yoke of the clutch throw-out fork (shown fragmentarily only at 16 in Figure 6). The manner in which the fork is connected to the throw-out collar is not a part of the present invention, and, therefore, is not shown in more detail.

An installation of a throw-out bearing embodying the present invention is shown in Figure 6. Here, a clutch assembly is shown generally at 17. The clutch comprises a fly wheel 18 which is fixed to the crank shaft 19, a clutch hub and disc 21, a friction ring 22 which is held against the clutch disc by a plurality of coil springs 23, and a cover plate 24 engaged by the coil springs 23. The clutch is disengaged by three or more arms 25. The arms 25 are pivotally journalled on the cover plate and are actuated by a collar 26 slidable on the driven shaft 27. The arms disengage the clutch by separating the friction plate from the clutch disc, overcoming the pressure of the coil springs 23, when the sleeve 26 is moved forwardly by engagement of the throw-out bearing. It will be understood that the clutch shown is typical of a number of clutches which can be actuated by the throw-out bearing disclosed here.

The ring element 11 of the throw-out bearing is countersunk in the collar. The collar is provided with a shoulder 28 against which the rear margin of the ring abuts when in place. The ring is slotted as at 29, to correspond to the slot 10 in the side of the collar 9. The replaceable key element 13 is adapted to fit snugly in the slots, and the key, collar, and ring are splined as at 30 (Figure 3). Thus, after the ring is seated in the collar and the key element is slipped in place, the ring is locked in its seat against any movement, rotative or axial. The face 31 of the ring projects axially from the collar to provide for contact. Also, the face of the key at its inner side is raised to correspond to the contour of the ring so that the bearing when assembled presents a continuous contact surface. Several ventilating grooves 32 are provided in the face of the bearing to conduct away excessive heat developed by friction between the bearing and the throw-out sleeve. The key is locked in place by the bolt 14. The bolt is journalled at its headed end in a boss 33 in the collar and passes through a hole in the key (Figure 4) and is threaded into another boss 34. Preferably, a lock washer is provided for the bolt 14 as at 35.

The cut out sections of the collar and ring are wider than the driven shaft 27, as shown in dot-dash lines at 36 in Figure 2. Thus, the bearing can be removed and replaced simply by taking out the bolt 14 and removing the key. The bearing can then be unseated and removed without disconnecting and dropping the driven shaft. The bearing itself can be removed (assuming that a bearing of this invention is in use) without disturbing the connection of the fork to the collar or the whole bearing assembly can be removed as a unit if necessary. An old bearing collar being of cast iron, it is easily removed without disturbing the shaft or clutch, simply by breaking it in two.

The present invention greatly simplifies the replacement of a new throw-out bearing. Furthermore, the key, being dove-tailed with the collar and with the ring, prevents any rotation of the bearing in its seat and holds the ring firmly in place against its seat. The throw-out bearing; that is, the key and ring assembly, preferably are provided with a loose slip fit in the collar with the bolt loose and the clearance taken up when the bolt is tightened. When the bearing elements are made of bronze, there is more probability of rotation; for bronze expands and contracts more than other materials such as carbon or graphite, conventionally used for this purpose. Therefore, the key function of the insert is of considerable importance with bronze bearing elements.

Having described my invention, I claim:

1. A throw-out bearing for a clutch, comprising a collar and bearing sections, one of said bearing sections consisting of an element having surfaces parallel with a line taken diametrically through the center of the bore of the collar and fitting within registering slots in the collar and other bearing section and thereby constituting a key to prevent rotation of the other bearing section.

2. A clutch throw-out bearing, consisting of a collar constituting the body of the bearing, a bearing element, said bearing element and body including registering slots generally radially disposed, a second bearing element disposed in said slots, and clamping means traversing the slots at right angles to the slots for holding said second bearing element in position.

3. A clutch throw-out bearing, comprising a body in the form of a collar, a bearing element fixed in the bore of the collar and projecting axially to provide a bearing surface, said body and bearing element including a removable section laterally of the bore thereof to permit assembly of the bearing laterally upon a shaft.

4. A clutch throw-out bearing, comprising a collar element including the means through which the collar is actuated, a bushing fixed in the bore of said collar and projecting axially to provide a bearing face, a substantially radially disposed slot provided in said collar and said bushing providing for lateral engagement of the bearing upon a shaft, and a bushing section detachably fixed in said slot, said bushing and bushing section providing a continuous bearing face.

5. A clutch throw-out bearing, comprising a collar adapted to be shifted along a shaft, said collar including a sleeve element in the bore thereof and projecting axially to provide an endwise bearing face, a section of said sleeve and collar being removable for providing complete clearance to the bore laterally through the side of the collar.

6. A clutch throw-out bearing consisting of a body of collar form including a bore, a bearing element of circular form fixed in said bore and extended axially to provide an endwise bearing face, said collar and bearing including a lateral slot, entering to the bore of the collar, the surfaces of said slot including dovetail grooves extended inwardly and an insert insertable into said slot, including dovetails engaging the grooves, said insert including a portion forming a section of the bearing element and extended to provide therewith a completely continuous circular bearing surface, and means for clamping said insert in position, said means comprising a clamping screw extending through the collar and across the slot through the insert.

7. A clutch throw-out bearing consisting of a body of collar form including a bore, a bearing element of circular form fixed in said bore and extended axially to provide an endwise bearing face, said collar and bearing including a lateral slot entering the bore of the collar, an insert insertable into said slot, said insert including a portion forming a section of the bearing element and extended to provide a completely continuous circular bearing surface, means to prevent axial displacement of the insert, and means for clamping said insert in position against outward movement.

8. A throw-out bearing for a clutch comprising a collar constituting the body of the bearing, a bearing element, said bearing element having a generally radially disposed slot therein, a bearing insert in said slot, said bearing insert and bearing element providing a side bearing surface, and means for retaining said bearing insert in position in said slot.

JACK R. DORMAN.